March 31, 1970 — G. O. TAYLOR — 3,503,639
CONSTRUCTION OF TUBULAR FRAME WORKS
Filed Aug. 8, 1967

Inventor
George Oswald Taylor
By Peck & Peck
Attorney 3,503,639
CONSTRUCTION OF TUBULAR FRAME WORKS
George Oswald Taylor, London, England, assignor to The British Aluminum Company Limited, London, England, a company of Great Britain
Filed Aug. 8, 1967, Ser. No. 659,088
Int. Cl. E04c *3/00;* F16b *1/00, 7/10, 7/18*
U.S. Cl. 287—20.92                2 Claims

ABSTRACT OF THE DISCLOSURE

A corner stake made from a densified wood laminate in a corner construction. Two angularly disposed arms forming said corner stake and each fitted inside a tubular element. A threaded blind bore at the junction of the two arms and a stud threaded in said bore and extending from the stake. A further densified wood laminate arm mounted on the stud and fitted inside a further tubular element.

---

The invention relates to improvements in corner connections for tubular frameworks. In the construction of furniture frames, space frames and the like from tubular members, mitred corner joints have advantages in appearance when compared with angular joints where the tube ends are cut at 90°, and the tubes inter-connected with a fitting designed either to embrace them, or having arms projecting from a corner piece to afford a fit inside the tube.

Hitherto, mitred corner joints have normally been made by bringing the angularly cut ends of the tubes into juxtaposition and then uniting them by welding or brazing; or by using a corner stake with angularly disposed arms to provide a fit inside the tube.

For strength and rigidity, corner stakes are normally made from metal. They may be cast, forged, extruded or machined from the solid. As they are made from non-yielding substance the dimensions must be controlled to close limits to enable them to fit closely in the tube bore, which is also subject to variation in dimensions resulting from manufacturing tolerances.

Such precision-made corner stakes require comparatively expensive tooling. New tools are necessary for different sizes of tubes and for any variation in angular displacement.

According to the present invention there is provided a corner connection between tubular elements comprising a corner stake made from a densified wood laminate having angularly disposed arms each fitted inside a tube. The term "densified wood laminate" is used herein to denote hardwood veneers kilned to a given moisture content, interleaved with synthetic resin and subjected to an elevated temperature and pressure. This results in the wood being compressed or "densified" into smaller volume.

Such densified wood laminates differ from normal plywood laminates in that they do not shrink, and combine strength, hardness and stiffness with excellent machining characteristics, and the ability to hold relatively easily to close dimensional tolerances. They therefore offer the material characteristics essential in a corner stake, i.e. strength and rigidity, plus the advantages of material economy and ease of machining to size by simpler techniques. They have a tendency to "yield" slightly when forced into a tube end therefore are not subject to such close dimensional tolerance considerations as "non-yielding" metal stakes.

A corner stake in one form is essentially L shaped. When mitred tubes are joined, by driving the ends of the stake into the tube ends, the mitred edges come into contact across the diagonal of the L. When tubes so joined are incorporated in a structural framework, stresses may be imposed on the joint in a number of ways.

(a) Force applied parallel with the longitudinal axis of the tube tends to pull the tube from the arm of the stake.

(b) Inward force may be exerted tending to close-in the angle between the tubes.

(c) Outward force may be exerted tending to open-out the angle between tubes.

(d) A twisting force may be exerted tending to rotate one tube about (the longitudinal axis of) the other.

While these conditions can be countered with metal corner-stakes, such stakes made from normal plywood laminates, or normal hardwood or softwood, are less satisfactory because of the "grain effect," which permits excessive deflection under load in one or more directions.

The densified wood laminates are far less prone to such "grain effect." Also, the modulus of elasticity is higher than that of normal woods or plywoods. In the form of corner stakes it will sustain greater loads before deflection will cause opening at the butting mitred ends of the tube.

By way of example, aluminum alloy tubes 1″ square by 16 SWG wall thickness, mitred and joined with wood corner stakes, yielded the following results when subjected to identical twisting forces:

| Wood | Load to opening of mitre joint | Load to breaking of mitre joint |
|---|---|---|
| Ash | | 18 ft.-lbs. |
| ⅞″ plywood | Circa 50 ft.-lbs | 70 ft.-lbs. |
| Densified wood | Over 90 ft.-lbs | 120–150 ft.-lbs. |

The densified wood joint compares favorably with identical tubing joined by flash-butt welding, where the mitre joint fails at around 100 ft.-lbs. It gives greater strength and rigidity than normal plywood and will sustain substantially higher loading before failure occurs.

A prime advantage of densified wood stakes over metal stakes is that in production no expensive tooling is needed. The wood is made in sheet form in varying thicknesses. Stakes can readily be cut to a desired size by a band-saw, jigsaw or spindle moulder with the aid of a simple adjustable jig. Changes of angle or dimensions can easily be accommodated and the machining characteristics are such that tolerances can be held to normal engineering limits.

While densified wood corner stakes can be used with any type of metal tubing, they are particularly suitable for use with aluminum alloy tubing in furniture and space frame constructions, where it was previously necessary to weld, or join with more expensive types of prefabricated fittings.

For a permanent joint in aluminum alloy tubing, the stake is cut to the nominal bore dimensions of the tube with a plus tolerance of between 5 and 15 thousands of an inch. For square or rectangular tubes all edges of the stake, including the extremities, are preferably chamfered so that clearance is afforded across the corners of the tube when the stake is inserted. Such chamfering prevents wedging across the diagonals which materially increases the force necessary to effect insertion and which may cause distortion of the tube.

A stake so made can be knocked or pressed home into the tube end without difficulty. The frictional force generated between tube and stake is such that on a ⅞" square cross section or equivalent, a pulloff force of around 400 lbs. is needed to cause movement of tube on stake.

If the stake is coated with a self-curing synthetic resin adhesive before it is inserted into the tube, the general resistance to all imposed loadings is substantially improved.

Where permanent joints are not desired, as in portable space-frames and the like, the dimensions of the stake may be adjusted so that the tube is a sliding fit thereon, and it may be held in position by wood-screws or other devices.

An advantage of the densified wood corner stake over a metal corner stake, is that it can readily be worked with normal woodworking tools, so that mass-produced stakes may easily be modified to meet particular requirements.

Some embodiments of the present invention will now be described by way of example with reference to FIGS. 1 to 13 of the accompanying drawings.

Figure 1:
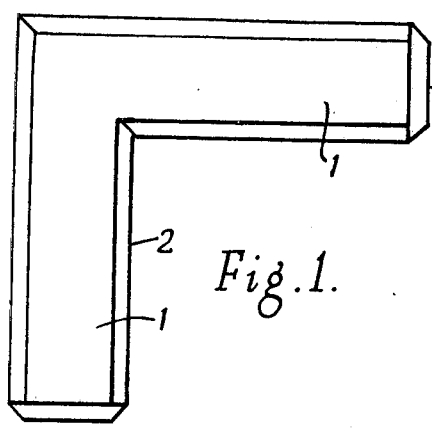
FIGURE 1 is a plan view of a corner stake according to the invention.
Figures 2, 3:
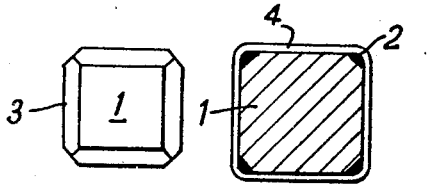
FIGURE 2 is an end view of an arm of the stake of FIGURE 1.
FIGURE 3 is a section of the arm in a tube.

FIG. 1 is a plan view of a densified wood corner stake according to the invention. This corner stake is substantially of L-shape having two arms 1 extending substantially normal to each other. In this example, the arms 1 are of substantially square cross-section and are bevelled at the corners as at 2 and tapered at their leading or free ends as at 3. FIG. 2 is an end view of an arm 1 and FIG. 3 is a section of an arm 1 inserted into a hollow rectangular tube 4. As can be seen in FIG. 3, the chamfered or bevelled edges 2 allow a clearance within the tube 4.

For certain types of applications, various devices may be incorporated into the stake design, still further to improve the strength and rigidity of a joint.

Figure 4:
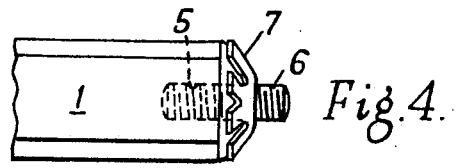
FIGURE 4 is a plan view of an end of an arm showing a modification.

For example, the densified wood will readily take a screw thread. As shown in FIG. 4, the extremities of an arm 1 may be drilled and tapped as at 5 to take a standard metal thread screw 6 and a helix washer 7. When this modified arm 1 is inserted into a tube, the application of pull-off force expands the washer 7 to prevent relative movement of tube and stake. (A ¼" BSW screw so entered to a depth of ¼" will, for example, withstand a force of over 600 lbs. before the wood thread will strip.)

Figure 5:
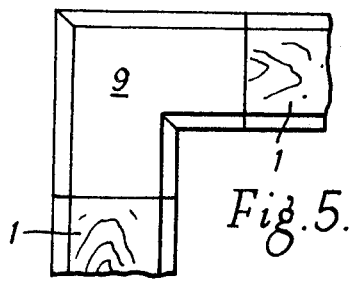
FIGURE 5 is a plan view of a modified corner stake according to the invention.
Figure 6:
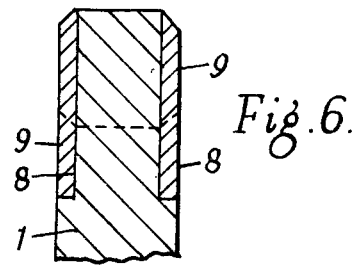
FIGURE 6 is a longitudinal section of the stake of FIGURE 5.

In FIGS. 5 and 6 the stake is shown recessed at 8 at the junction of the arms 1 on each of two opposed faces to take L-shaped metal stiffening plates 9 which are adhesive-bonded on. These plates 9 effectively increase resistance to twisting and other forces imposed on the joint. Such modification is therefore useful for increasing the joint strength of longitudinal furniture members as in a settee, or bed.

A stake so treated with ⅛" thick side plates of BA25WP alloy failed under twisting load at 230 ft.-lbs. as compared with failure at 120–150 ft.-lbs. in unmodified condition.

Figure 7:
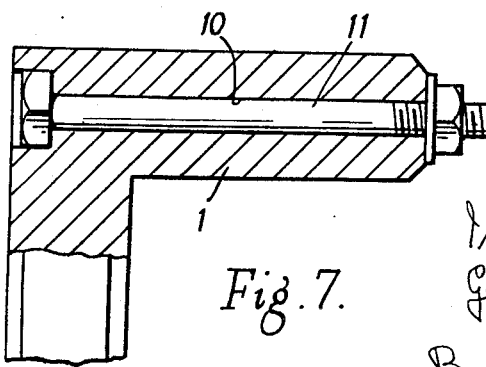
FIGURE 7 is a plan view, partly in section of a further modification of a corner stake.
Figure 8:
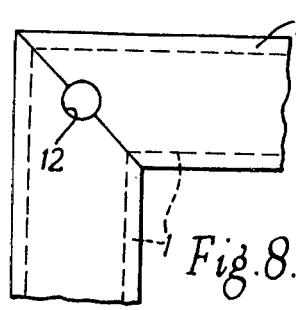
FIGURE 8 is a plan view of a corner joint utilizing a corner stake.
Figure 9:
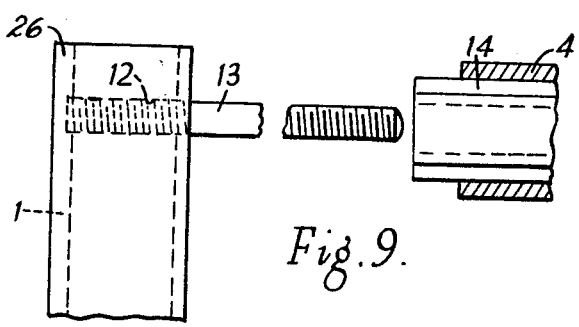
FIGURE 9 is a side elevation of the joint of FIGURE 8 showing further features.

As shown in FIG. 7, the strength of one arm 1 of a corner stake may be increased by drilling a passage 10 therethrough and inserting a steel bolt 11 through the passage 10 with the head countersunk.

Where structural members in a furniture or space-frame are required to project from a mitred corner joint at right-angles, the use of densified wood for the corner stake offers a wide choice of means by which this may be done. For example, as shown in FIGS. 8 and 9, the corner joint may be drilled and tapped from one side as at 12 for substantially the full depth of the wood, but not sufficiently to break through on the opposite face. A metal stud 13 can be screwed in, over which can be slipped an appropriately drilled wood, metal or plastic projection 14 of cross-sectional shape and dimensions such that it can be inserted into a tubular member. The projection 14 is secured to the metal stud by a nut (not shown).

Figure 10:
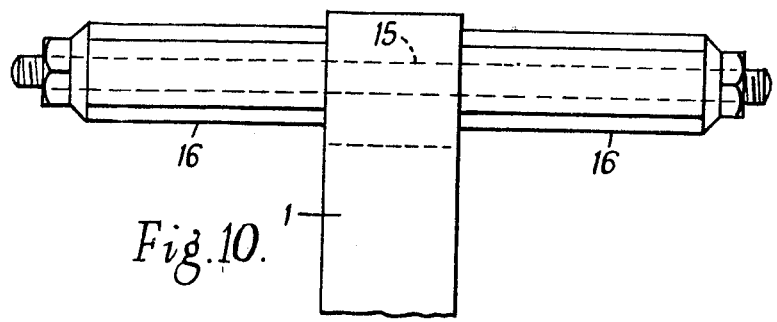
FIGURE 10 is a plan view of a through joint.

FIG. 10 illustrates a through joint made on the same principle. Here the corner joint is drilled right through and a rod 15 threaded at the extremities provides a means of fixing two suitable arms or projections 16.

Screw threads can be provided in the corner joint in a number of other ways.

Figure 11:
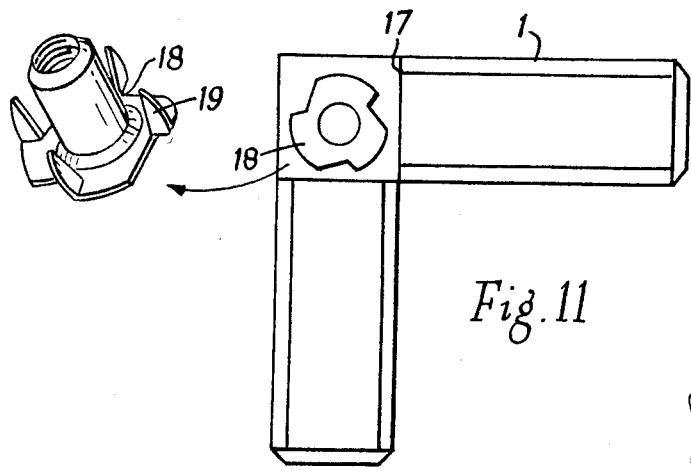
FIGURE 11 is a plan view of a corner stake incorporating a threaded insert.

FIG. 11 shows a corner stake drilled and recessed at 17 to take a proprietary screwed metal fixture 18 provided with prongs 19 that can be hammered home into the wood.

Figure 12:
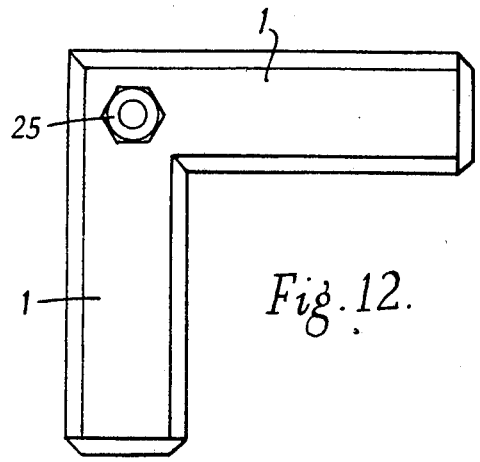
FIGURE 12 is a plan view of a variation of the construction of FIGURE 11.

A densified wood corner stake can be drilled and countersunk as in FIG. 12 so that when a standard nut 25 is pressed home into the counterbore it is flush with the surface of the stake but is prevented from rotating by the embedding of the sharp corners of the nut in the wood.

A corner stake may also be drilled to accommodate a proprietary caged nut.

Figure 13:
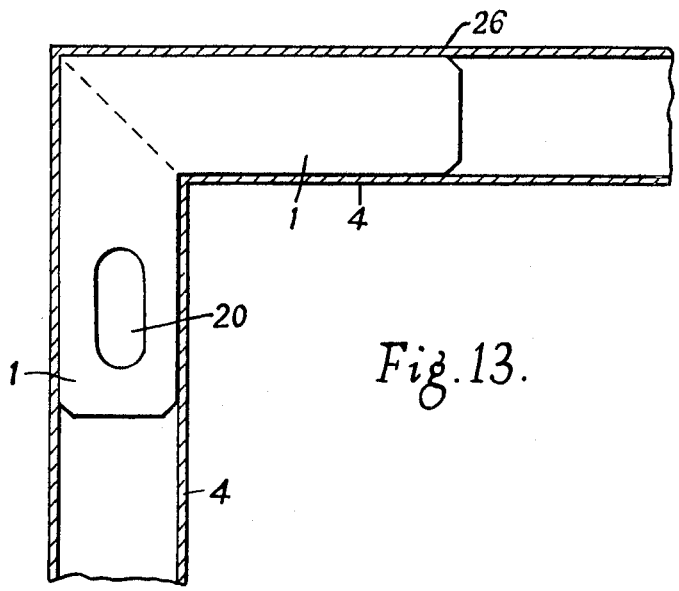
FIGURE 13 is a plan view, partly in section, of a framework with a corner stake.

A further advantage of densified wood stakes is that they may readily be adjusted for length of arm so that mortise joints, for example, can be made by conventional means. As shown in FIG. 13, a metal frame-work 26 joined by a corner stake having two arms 1 can be made to incorporate a wooden member which is tenoned into a mortise 20 in one of the arms 1 to extend at right angles thereto and through the metal framework and is secured by gluing or dowelling as commonly practised in the wood working industry.

It will of course be understood the arms 1 of a corner stake can make an angle of other than 90° with respect to each other.

I claim:

1. A corner connection between tubular elements comprising a corner stake made from a densified wood laminate and having two angularly disposed arms each fitted inside a tubular element the junction of the said two arms defining a threaded blind bore extending for the major part of the thickness of the corner stake, a stud having a threaded end engaged in the bore and extending from the stake and a further densified wood laminate arm positioned over the stud and fitted inside a further tubular element.

2. A corner connection according to claim 1 having at least two arms having axes in a common plane, and the threaded bore having an axis substantially normal to the common plane.

References Cited

UNITED STATES PATENTS

| | | |
|---|---|---|
| 1,343,209 | 6/1920 | Gwyer. |
| 3,008,741 | 11/1961 | MacCormack. |
| 2,083,354 | 6/1937 | Whittier. |
| 2,263,198 | 11/1941 | Valiton. |
| 3,270,610 | 9/1966 | Knowlton _____ 151—41.73 |
| 3,317,227 | 5/1967 | Nijhuis. |
| 3,368,836 | 2/1968 | Storlie et al. |

FOREIGN PATENTS

| | | |
|---|---|---|
| 373,230 | 4/1923 | Germany. |
| 862,049 | 1/1953 | Germany. |

RAMON S. BRITTS, Primary Examiner

U.S. Cl. X.R.

287—54, 189.36